United States Patent [19]

Mizuguchi et al.

[11] Patent Number: 5,548,349
[45] Date of Patent: Aug. 20, 1996

[54] TRANSMISSION TYPE COLOR LIQUID DISPLAY APPARATUS WITH FIRST AND SECOND LENS LAYERS LOCATED BETWEEN A WHITE LIGHT SOURCE AND THE DISPLAY DEVICE

[75] Inventors: Yoshihiro Mizuguchi, Tenri; Hiroshi Hamada, Nara, both of Japan

[73] Assignee: Sharp Kabushiki Kaisha, Osaka, Japan

[21] Appl. No.: 360,412

[22] Filed: Dec. 21, 1994

[30] Foreign Application Priority Data

Dec. 27, 1993 [JP] Japan ............................ 5-333767

[51] Int. Cl.$^6$ .............................. H04N 5/74; H04N 9/31; G02F 1/1335; G03B 21/60
[52] U.S. Cl. ............................ 348/766; 348/761; 359/49; 359/456; 359/624
[58] Field of Search .............................. 348/761, 766, 348/790, 791; 345/87, 88; 359/48, 49, 455, 456, 618, 619, 621, 623, 624, 634; H04N 5/74, 9/31

[56] References Cited

FOREIGN PATENT DOCUMENTS

| | | | |
|---|---|---|---|
| 0409619A2 | 1/1991 | European Pat. Off. | H04N 5/74 |
| 60-262131 | 12/1985 | Japan | G02F 1/133 |
| 2-149837 | 6/1990 | Japan | G03B 21/00 |
| 3-233417 | 10/1991 | Japan | G02B 7/02 |
| 4-60538 | 2/1992 | Japan | G03B 33/12 |

OTHER PUBLICATIONS

Oikawa et al, "Distributed–Index Planar Microlens", Applied Optics, vol. 21, No. 6, 1982, pp. 1052–1056.
Electronics Letters, "Distributed–Index Planar Microlens Array Prepared From Deep Electromigration", vol. 13, No. 17, 1981, pp. 452–454.

*Primary Examiner*—Victor R. Kostak
*Assistant Examiner*—John W. Miller
*Attorney, Agent, or Firm*—Nixon & Vanderhye P.C.

[57] ABSTRACT

A color liquid crystal display apparatus according to the present invention includes: a transmission type liquid crystal display device including a plurality of pixels arranged in a matrix along a first direction and a second direction perpendicular to the first direction, wherein incident light is spatially modulated by selecting one of the plurality of pixels, a white light source for emitting white light; dichroic mirrors for splitting the white light emitted from the white light source into at least three bundles of rays of different wavelength bands, the bundles of rays going out from the dichroic mirrors at different angles; lenticular lens layers provided between the liquid crystal display device and the dichroic mirrors, the lenticular lens layers converging the bundles of rays led through the dichroic mirrors onto different ones of the plurality of pixels depending on the wavelength bands thereof, wherein the lenticular lens layers includes a first lenticular lens layer and a second lenticular lens layer, the first lenticular lens layer includes a plurality of first lenticular lenses extending along the first direction, and the second lenticular lens layer including a plurality of second lenticular lenses extending along the second direction, and wherein the first lenticular lenses are arranged at a pitch which is at least three times as large as a pitch at which the plurality of pixels are arranged along the second direction, and the second lenticular lenses are arranged at a pitch which is equal to a pitch at which the plurality of pixels are arranged along the first direction.

17 Claims, 8 Drawing Sheets

TRANSMISSION TYPE COLOR LIQUID DISPLAY APPARATUS WITH FIRST AND SECOND LENS LAYERS LOCATED BETWEEN A WHITE LIGHT SOURCE AND THE DISPLAY DEVICE

BACKGROUND OF THE INVENTION

1. Field of the Invention

The present invention relates to a single-panel type color liquid crystal display apparatus to be used for example as a compact projection type color liquid crystal television system or a thin color information display apparatus. The single-panel type liquid crystal display device conducts a color display by means of one liquid crystal display device, without using a mosaic-like color filter.

2. Description of the Related Art

Projection type display methods for displaying color images are categorized into a so-called single-panel method, in which a single liquid crystal display device is used, and a three-panel method, in which three liquid crystal display devices corresponding to the three primary colors are used.

According to the single-panel method, a color filter of a mosaic-like or stripe-like configuration, designed to correspond to the respective pixels included in a liquid crystal display device, is used. An example of a single-panel method is disclosed in Japanese Laid-Open Patent Publication No. 59-230383. This method has an advantage in that the configuration of the optical system may be simple, and that only a liquid crystal display device is used, thereby allowing the entire system to be compact. However, according to this method, about ⅔ of light irradiated onto the liquid crystal display device is absorbed or reflected by the color filter, thereby decreasing the brightness of the displayed image.

On the other hand, according to the three-panel method, a light beam is separated into the three primary colors, i.e., red, green, and blue, by using a wavelength selection element. An optical system for transmitting the light beam of each primary color, and three liquid crystal display devices for forming images by controlling the light beams of the respective colors are used, so as to conduct color display by optically overlaying the images of the respective primary colors. An example of a three-panel method is disclosed in Japanese Laid-Open Patent Publication No. 60-169827. This method has an advantage in that the emitted light beams can be utilized at high efficiency, so that images of brightness of about three times as high as that of images by the single-panel method can be obtained. However, this method is more disadvantageous, in terms of cost and compactness, than the single-panel method because it requires a larger number of component elements.

A method for solving the above-mentioned problems of the single-panel method and the three-panel method is proposed in Japanese Laid-Open Patent Publication No. 4-60538. In a first example of this proposal, a white light beam emitted from a light source is separated into light beams of red, blue, and green by means of dichroic mirrors disposed in a fan-shaped arrangement. The light beams are incident, at their respective incident angles different from each other, on a microlens array of a lenticular shape disposed by the light source side of a simple matrix type liquid crystal display device incorporating stripe-shaped electrodes. The microlens array has a semicylindrical shape extending along a vertical direction (e.g., a longitudinal direction) of the display of the liquid crystal display device. The pitch of the microlenses is equivalent to three pixels of the liquid crystal display device. The light beams of the wavelength bands of red, blue, and green are led through the microlenses at their respective incident angles so as to be incident on portions of the liquid crystal corresponding to their respective colors, and are subjected to optical modulation for each color in accordance with an image signal. The light beams which have passed through the liquid crystal portions are converged onto an aperture of a projection lens by a field lens provided for preventing the light beams from being diffused to the peripheral portions. Thus, a color image is projected.

The method according to the above proposal has an advantage, as compared to the two methods mentioned above, in that no absorption of light occurs because no color filter is used, thereby providing a color image of a brightness of about three times as high as that of an image obtained by the conventional single-panel method. This method is also advantageous in terms of cost and compactness because, being a single-panel method, the number of the component elements can be smaller than in the case of a three-panel method.

Furthermore, a second example of the above-mentioned proposal discloses a combination of an active matrix liquid crystal display device including pixels disposed in a delta arrangement and hexagonal-shaped microlenses, which provides similar effects.

However, the single-panel method according to the above-mentioned proposal has the following problems (1) and (2). Problem (1) corresponds to the case where the method is applied to an active matrix type liquid crystal display device of a delta arrangement type, while problem (2) corresponds to the case where the method is applied to an active matrix type liquid crystal display device of a stripe arrangement type:

(1) The delta arrangement, which is a suitable arrangement of pixels for displaying television images, video images, and the like, requires a bus line of TFTs (Thin Film Transistors) in a crank-like shape so as to produce the active matrix type liquid crystal display device. The presence of such a crank-like portion leads to a decrease in the aperture ratio and the yield of the active matrix type liquid crystal display device (because of the difficulty in forming such a portion), thereby making this arrangement more disadvantageous than the stripe arrangement.

(2) In an active matrix type liquid crystal display device of a stripe arrangement type, pixels are arranged in a stripe-shape. According to the method of the above-mentioned proposal (single-panel method), light beams of different incident angles are distributed for liquid crystal portions corresponding to their respective colors by means of a microlens array of a lenticular shape. As a result, the light beams, when converged, form a stripe shape extending along the vertical direction. However, an active matrix type liquid crystal display device incorporates a black matrix of a lattice configuration between the pixels. As a result, the stripe-shaped light beams can pass only through the apertures of the pixels, and are interrupted in the other portions (such as the lattice portion of the black matrix). Therefore, there is a problem in that the screen illuminance is limited by the ratio of the aperture of the liquid crystal display device, which is determined in accordance with the ratio of the pitch of the pixels along the vertical direction to the size of the apertures.

The above-mentioned problems could be solved by, for example, providing an oblong microlens array which is longer horizontally than vertically, the lenticular lens layer being divided at the pixel pitch and having a curvature along the vertical direction as well as in the horizontal direction. In this case, the two functions of distribution of light beams along the horizontal direction and the conversion of light along the vertical direction are performed at the same time, so as to improve the ratio of the aperture.

In the above-mention case, each lens is oblong along the horizontal direction, so as to be long enough to extend to an equivalent of three pixels. However, microlenses may be formed by rounding the surface of a heated lens material by leaving the material in a fluid state so as to utilize the surface tension thereof, or by using such products as originals for producing replicas. In the case where the contour of the microlens is an oblong rectangular shape, a curved surface of a torus shape is obtained, resulting in a large astigmatism of the microlens. Moreover, a microlens produced by an ion exchanging method can also have astigmatism. In either case, the astigmatism of the microlens prevents any light from being converged into a small point. In order to converge light into one point, the lens surface must be spherical or axially symmetrical. However, a microlens produced by either of the above-mentioned methods has different curvatures along the vertical direction and the horizontal direction.

SUMMARY OF THE INVENTION

A color liquid crystal display apparatus according to the present invention includes: a transmission type liquid crystal display device including a plurality of pixels arranged in a matrix along a first direction end a second direction perpendicular to the first direction, wherein incident light is spatially modulated by selecting at least one of the plurality of pixels, a white light source for emitting white light; light splitting means for splitting the white light emitted from the white light source into at least three bundles of rays of different wavelength bands, the bundles of rays going out from the light splitting means at different angles; lens means provided between the liquid crystal display device and the light splitting means, the lens means converging the bundles of rays led through the light splitting means onto different ones of the plurality of pixels depending on the wavelength bands thereof, wherein the lens means includes a first lenticular lens layer and a second lenticular lens layer, the first lenticular lens layer including a plurality of first lenticular lenses extending along the first direction, and the second lenticular lens layer including a plurality of second lenticular lenses extending along the second direction, and wherein the first lenticular lenses are arranged at a pitch which is at least three times as large as a pitch at which the plurality of pixels are arranged along the second direction, and the second lenticular lenses are arranged at a pitch which is equal to a pitch at which the plurality of pixels are arranged along the first direction.

In one embodiment of the invention, the second lenticular lens layer is located between the first lenticular lens layer and the liquid crystal display device.

In another embodiment of the invention, the first lenticular lens layer is located between the second lenticular lens layer and the liquid crystal display device.

In still another embodiment of the invention, the second lenticular lens layer is in close contact with the liquid crystal display device.

In still another embodiment of the invention, the second lenticular lens layer is formed on one of a pair of substrates included in the liquid crystal display device.

In still another embodiment of the invention, the first lenticular lens layer is formed on a first transparent substrate, and the second lenticular lens layer is formed on a second transparent substrate.

In still another embodiment of the invention, one of the first and second transparent substrates that is located closer to the liquid crystal display device is thinner than one of the first and second transparent substrates that is located farther from the liquid crystal display device.

In still another embodiment of the invention, the first and second transparent substrates with the first and second lenticular lens layer formed thereon are attached to each other in such a manner that the first lenticular lens layer and the second lenticular lens layer are adjacent each other.

In still another embodiment of the invention, an adhesive layer is provided between the first lenticular lens layer and the second lenticular lens layer.

In still another embodiment of the invention, the first lenticular lens layer is formed on a transparent substrate; a transparent leveling layer is formed on the first lenticular lens layer so as to form an even surface over the first lenticular lens layer; and the second lenticular lens layer is formed on the even surface of the leveling layer.

In still another embodiment of the invention, a cover is provided on a surface of the second lenticular lens layer.

In still another embodiment of the invention, the cover is made of glass.

In still another embodiment of the invention, the cover is a film.

In still another embodiment of the invention, the cover is thinner than the transparent substrate.

In still another embodiment of the invention, at least one of the first and second transparent substrates is lapped to a predetermined thickness.

In still another embodiment of the invention, the glass is lapped to a predetermined thickness.

Alternatively, a color liquid crystal display apparatus according to the present invention includes: a transmission type liquid crystal display device including a plurality of pixels arranged in a matrix along a first direction and a second direction perpendicular to the first direction, wherein incident light is spatially modulated by selecting at least one of the plurality of pixels, light emitting means for emitting at least three bundles of rays of different wavelength bands at different angles; lens means provided between the liquid crystal display device and the light emitting means, the lens means converging the bundles of rays emitted from the light emitting means onto different ones of the plurality of pixels depending on the wavelength bands thereof, wherein the lens means includes a first lenticular lens layer and a second lenticular lens layer, the first lenticular lens layer including a plurality of first lenticular lenses extending along the first direction, and the second lenticular lens layer including a plurality of second lenticular lenses extending along the second direction, and wherein the first lenticular lenses are arranged at a pitch which is at least three times as large as a pitch at which the plurality of pixels are arranged along the second direction, and the second lenticular lenses are arranged at a pitch which is equal to a pitch at which the plurality of pixels are arranged along the first direction.

In accordance with a color liquid crystal display apparatus of the present invention, lenticular lenses arranged at a pitch at least three times as large as a pitch of pixels along a second direction function so as to converge and distribute bundles of rays. Moreover, lenticular lenses arranged at a pitch equal to a pitch of pixels along a first direction serve to converge light along the first direction. The two arrays of lenticular lenses thus having different functions, it is possible to ensure that substantially all the bundles of rays contribute to the display without being interrupted.

Thus, the invention described herein makes possible the advantage of providing a color liquid crystal display apparatus having an improved brightness, the apparatus incorporating a liquid crystal display device in which pixels are arranged in a stripe shape.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of examples, with reference to the accompanying drawings.

EXAMPLE 1

Figure 1:
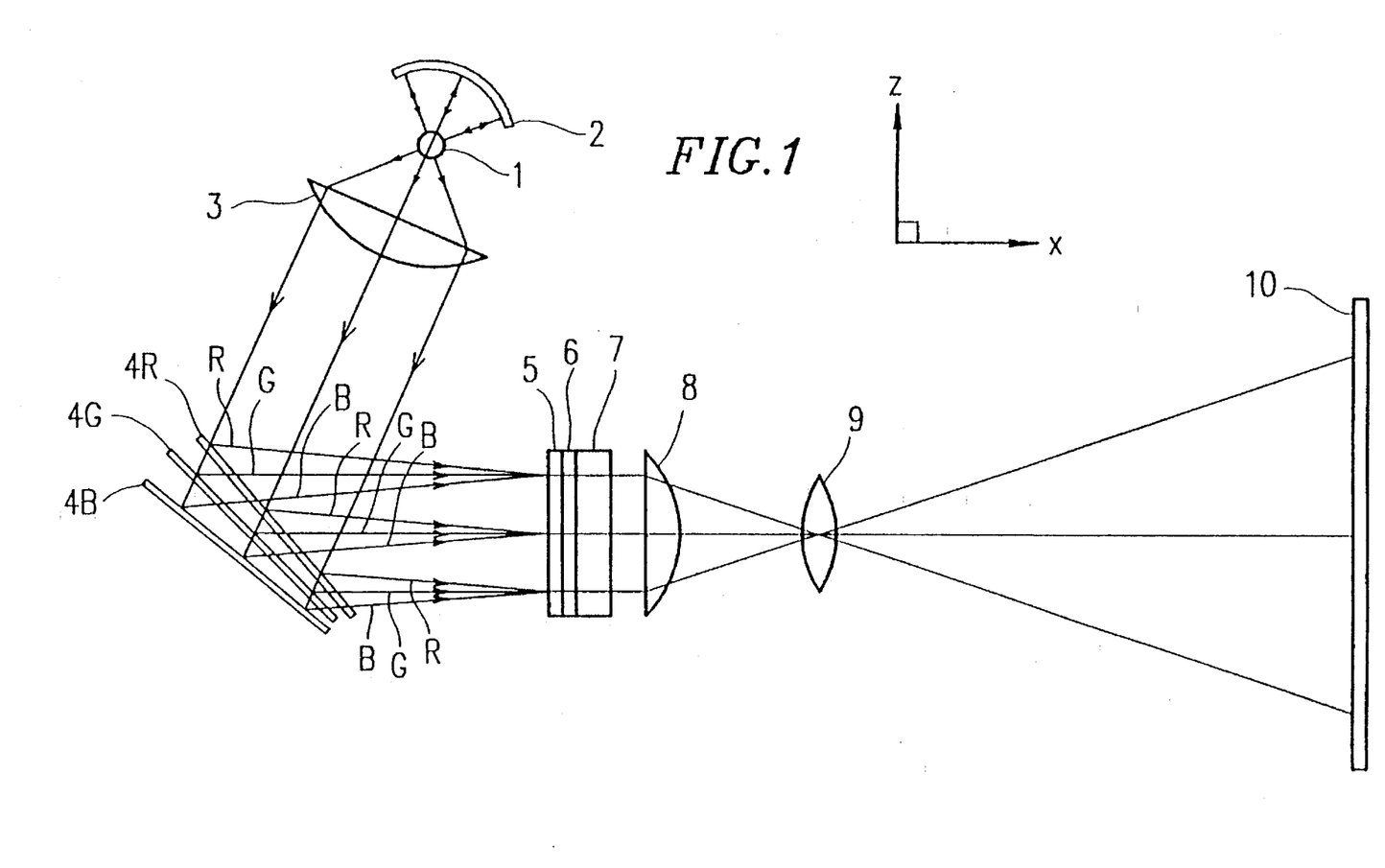
FIG. 1 is a schematic view showing a configuration for an apparatus according to a first example of the present invention.

FIG. 1 is a schematic view showing a configuration for a liquid crystal display apparatus according to Example 1 of the present invention. In this liquid crystal display apparatus, light emitted from a white light source 1 is led through a condenser lens 3, either directly or after being reflected by a spherical mirror 2, so as to be incident on three kinds of dichroic mirrors 4R, 4G, and 4B. Light reflected by the dichroic mirrors 4R, 4G, and 4B (i.e., red light, green light, and blue light) is led through lenticular lens layers 5 and 6 and a liquid crystal display block 7, travels through a field lens 8 and a projection lens 9, and is projected onto a projection screen 10.

As the white light source 1, a metal halide lamp having an output power of 150W, an arc length of 5 mm, and an arc diameter of 2.2 mm is used in the present example. The white light source is provided in such a manner that the arc is disposed perpendicularly to the x-axis and z-axis shown in FIG. 1 (i.e., this direction will hereinafter be referred to as the "y-axis" direction). Other white light sources such as a halogen lamp or a xenon lamp may also be used.

The spherical mirror 2 is disposed behind the white light source 1. The condenser lens 3 is disposed in front of the white light source 1. In the present example, the condenser lens 3 has a diameter of 80 mm and a focal length of 60 mm. The spherical mirror 2 and the white light source 1 are disposed in such a manner that the center of a light-emitting portion of the white light source 1 coincides with the focal point of the condenser lens 3. Thus, light emitted from the white light source 1 and led through the condenser lens 3 forms a bundle of substantially parallel rays. Such a bundle of parallel rays can be also obtained by a method using a conic mirror or by a method using an ellipse of a revolution mirror and an integrator.

Light which has passed through the condenser lens 3 is incident on the three kinds of dichroic mirrors 4R, 4G, and 4B. The dichroic mirrors 4R, 4G, and 4B are disposed at different angles. The dichroic mirrors 4R, 4G, and 4B have such properties that they selectively reflect light of wavelength bands corresponding to red, green, and blue, respectively, and transmit light of the other wavelength bands. The dichroic mirrors 4R, 4G, and 4B are disposed in this order on the optical axis. (Hereinafter (R), (G), and (B) stand for red, green, and blue, respectively.) The dichroic mirrors 4R, 4G, and 4B are formed by a known thin multilayer film coating technique. Preferably, the dichroic mirrors 4R, 4G, and 4B are designed so as to transmit infrared light. Therefore, the temperature of the liquid crystal display block 7 is prevented from rising.

In the present example, the dichroic mirror 4R is disposed in such a manner that the white light is incident, on the optical axis, at an incident angle of about 30°. The dichroic mirrors 4R, 4G, and 4B are disposed at angles of several degrees with respect to each other, with the y-axis (not shown) being the axis of rotation. The relative angles (θ) at which dichroic mirrors 4R, 4G, and 4B are disposed with respect to each other can be derived from the pixel pitch P of the liquid crystal display block 7 and the focal length $f_\mu$ of lenticular lenses 5a (not shown).

By thus disposing the dichroic mirrors 4R, 4G, and 4B, the bundles of rays of (R), (G), and (B) are incident on the lenticular lens layer 5 at different incident angles. In the present example, as shown in FIG. 1, the (G) bundle of rays is disposed in the center so as to be perpendicularly incident on the lenticular lens layer 5, with the (R) and (B) bundles of rays being at angles with respect to the (G) bundle of rays on the x-z plane so as to be symmetrical with respect to the (G) bundle of rays. In FIG. 1, the white light emitted from the white light source 1 is separated into light of the three primary colors (R), (G), and (B). However, the white light may also be separated into four or more colors, so that the liquid crystal display apparatus will be applicable to graphic display purposes. Four or more color light sources may emit the four or more colors. In the case where light beams of four colors are incident on the lenticular lens layer 5, the pitch of the lenticular lenses 5a along the z-axis direction is prescribed so as to be four times as large as the pitch P of the pixels, whereby the effect of the present invention (to be described below) is conserved. Similarly, in the case where the number of colors is five, the pitch of the lenticular lenses 5a along the z-axis direction is prescribed so as to be five times as large as the pitch P of the pixels; in the case where the number of colors is six, the pitch of the lenticular lenses 5a along the z-axis direction is prescribed to be six times as large as the pitch P of the pixels; and so on.

Figure 2A:
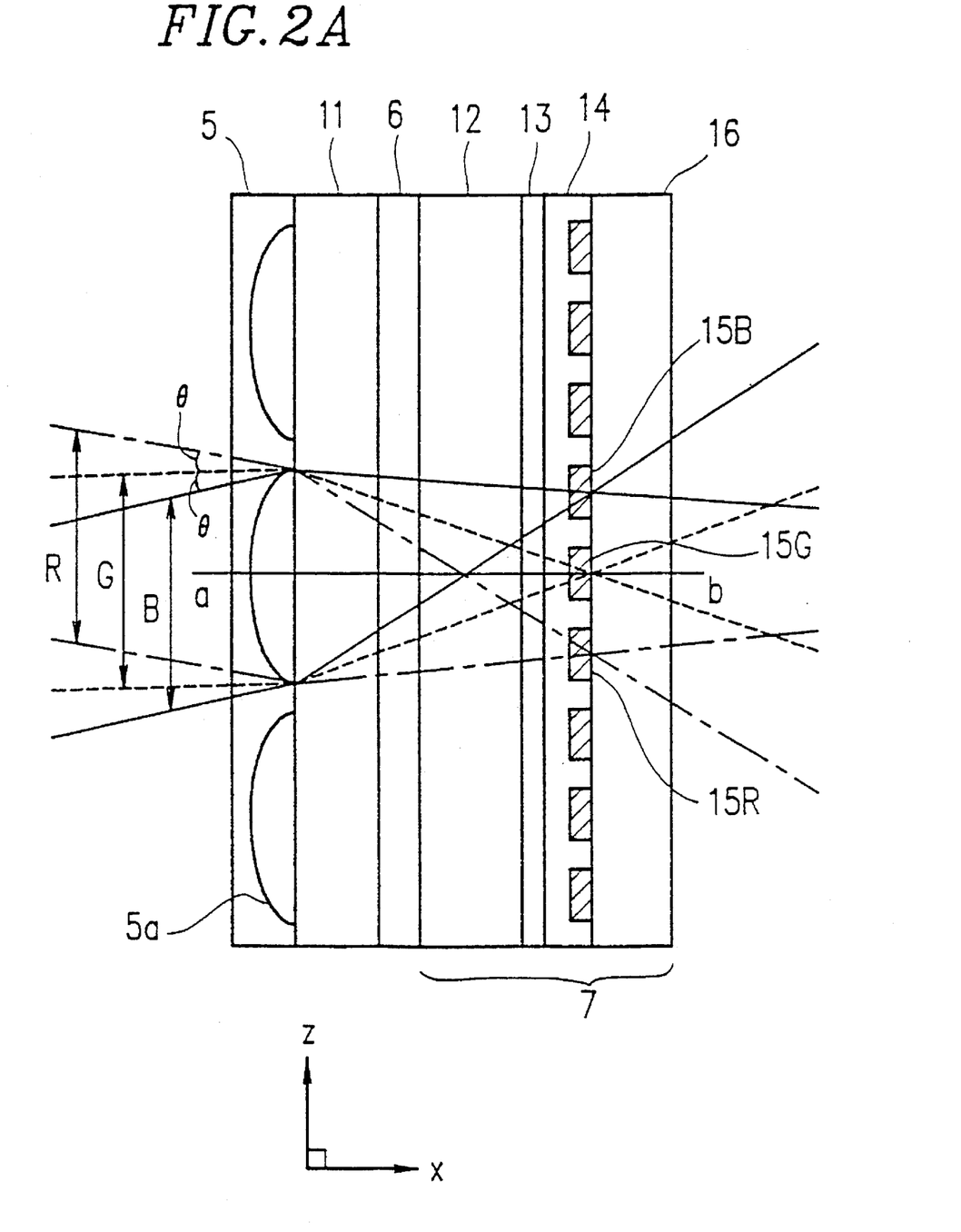
FIG. 2A is a view showing the vicinity of an essential portion of a liquid crystal display device shown in FIG. 1.

FIG. 2A is a schematic view showing a cross section (on the x-z plane) of an essential portion of the liquid crystal display apparatus, i.e., the lenticular lens layers 5 and 6 as well as the liquid crystal display block 7. The lenticular lenses 5a extend along the y-axis direction (not shown) so as to be parallel to each other. In FIG. 2A, component elements of the liquid crystal display block 7 such as polarizing plates and alignment films are omitted for conciseness. A glass substrate 11 is interposed between the lenticular lens layer 5 on the side from which light enters (i.e., on the left side in the figure) and the other lenticular lens layer 6. The liquid crystal display block 7 is disposed on the face of the lenticular lens layer 6 opposite to the face that is in contact with the glass substrate 11.

The liquid crystal display block 7 includes glass substrates 12 and 16 and a liquid crystal layer 14, in which TN (Twisted Nematic) liquid crystal is sealed. The liquid crystal is dynamically driven via semiconductor TFTs (not shown) for switching rectangular pixels arranged in a matrix, so as to conduct the display. The configuration of the pixels is generally determined in accordance with the size of pixel electrodes (indicated as hatched portions in FIG. 2A). However, in cases where a light interrupting member such as a black matrix is provided between the glass substrate 12 and pixel electrodes 15, the configuration of the pixels is determined in accordance with the apertures of the light interrupting member and the size of the pixel electrodes. In the present example, the pitch of the pixels is 100 μm along both the vertical direction (i.e., the z-axis direction) and the horizontal direction (i.e., the y-axis direction (not shown)); the aperture of each pixel is 50 μm×70 μm (vertical× horizontal); and the number of pixels is 450×600 (vertical× horizontal), the pixels being disposed in a stripe arrangement. Pixels 15R, 15G, and 15B corresponding to red, green, and blue light, respectively, are disposed on an inner face of the glass substrate 16. A transparent electrode 13 is interposed between the glass substrate 12 and the liquid crystal layer 14.

Unlike the conventional single-panel method, the liquid crystal display block 7 of the present example does not require a color filter. Instead, the semicylindrical (convex) lenticular lenses 5a are provided, each lenticular lens 5a having a width of 300 μm, which is equivalent to the extent covered by the three pixels 15R, 15G, and 15B, along the z-axis direction. The lenticular lens layer 5 is composed of lenticular lenses 5a disposed in parallel to each other. The focal length of the lenticular lenses 5a is prescribed so as to be substantially 1.1 mm, which is equal to a total thickness t of the glass substrates 11 and 12. (The thickness of the lenticular lens layer 6 is extremely small as compared with that of the glass substrate 11 or 12, and therefore is negligible.) The focal length of each lenticular lens 5a, measured in the atmosphere, would give t/n≈1.1 mm/1.53≈0.72 mm. Herein, n represents the refractive index of the glass substrates 11 and 12.

Each Of the lenticular lens layers 5 and 6 is a kind of microlens array. Examples of methods for producing the lenticular lens layers 5 and 6 include: an ion exchanging method (Appl. Opt. Vol. 21, p. 1052 (1982), or Electron. Lett. Vol. 17, p. 452 (1981)), a swelling method (Suzuki et al., "A new method for producing plastic microlenses" 24th Mircrooptics Society), a heat deformation method (Zoran D. Popovic et al., "Technique for monolithic fabrication of microlens arrays", Appl. Opt. Vol. 27, p. 1281 (1988)), a vapor deposition method (Japanese Laid-Open Patent Publication No. 55-135808), a heat transfer method (Japanese Laid-Open Patent Publication No. 61-64158), a mechanical process method; and a 2P method (photopolymer method; Japanese Laid-Open Patent Publication No. 3-233417). Hereinafter, the present example illustrates the case where lenticular lenses produced by the 2P method are used.

According to the 2P method, lenticular lenses are produced as follows: A stamper is fabricated from a metal such as Ni so as to serve as an original for the lenses. The stamper is pressed onto an ultraviolet-ray sensitive resin applied on a glass substrate, and the resin is irradiated with ultraviolet rays through the substrate, so as to be cured and processed into a desired form. Thus, replicas of e microlens can be mass-produced.

By irradiating the lenticular lens 5a with a bundle of parallel rays entering from a predetermined direction, a bundle of rays of the same color is converged into a single line (hereinafter referred to as a "converged light line"), thereby forming three converged light lines. The respective lines of bundles of rays of the same color are spaced at an interval of about 300 μm from each other. The width W of each converged light line is derived in accordance with the following equation (1):

$$W = A\Phi \times f_\mu/f_c \qquad (1)$$
$$= 2.2 \text{ mm} \times 0.72 \text{ mm}/60 \text{ mm} = 26.4 \text{ μm}$$

where AΦ represents the arc diameter of the white light source 1; $f_\mu$ represents the focal length of each lenticular lens 5a; and $f_c$ represents the focal length of the condenser lens 3. The width W of each converged light line is substantially conserved at the apertures of the pixels, and therefore fits within the width of each pixel aperture along the z-axis direction, i.e., 70 μm.

The relative angles of the dichroic mirrors 4R, 4G, and 4B must satisfy the following equation (2) in order to ensure that the converged light lines are formed so as to be offset from each other by the pitch P, and that the two converged light lines sandwiching the middle converged light line are incident on the respective pixel apertures adjoining the pixel aperture on which the middle converged light line is incident:

$$p = f_\mu \times \tan \theta \qquad (2)$$

where P represents the pixel pitch; end θ represents the difference between the incident angles of the respective incident bundles of rays. In the present example, the incident angle θ satisfies the following equation (3):

$$\theta = \tan \theta^{-1} (100/720) = 8° \qquad (3)$$

Figure 2B:
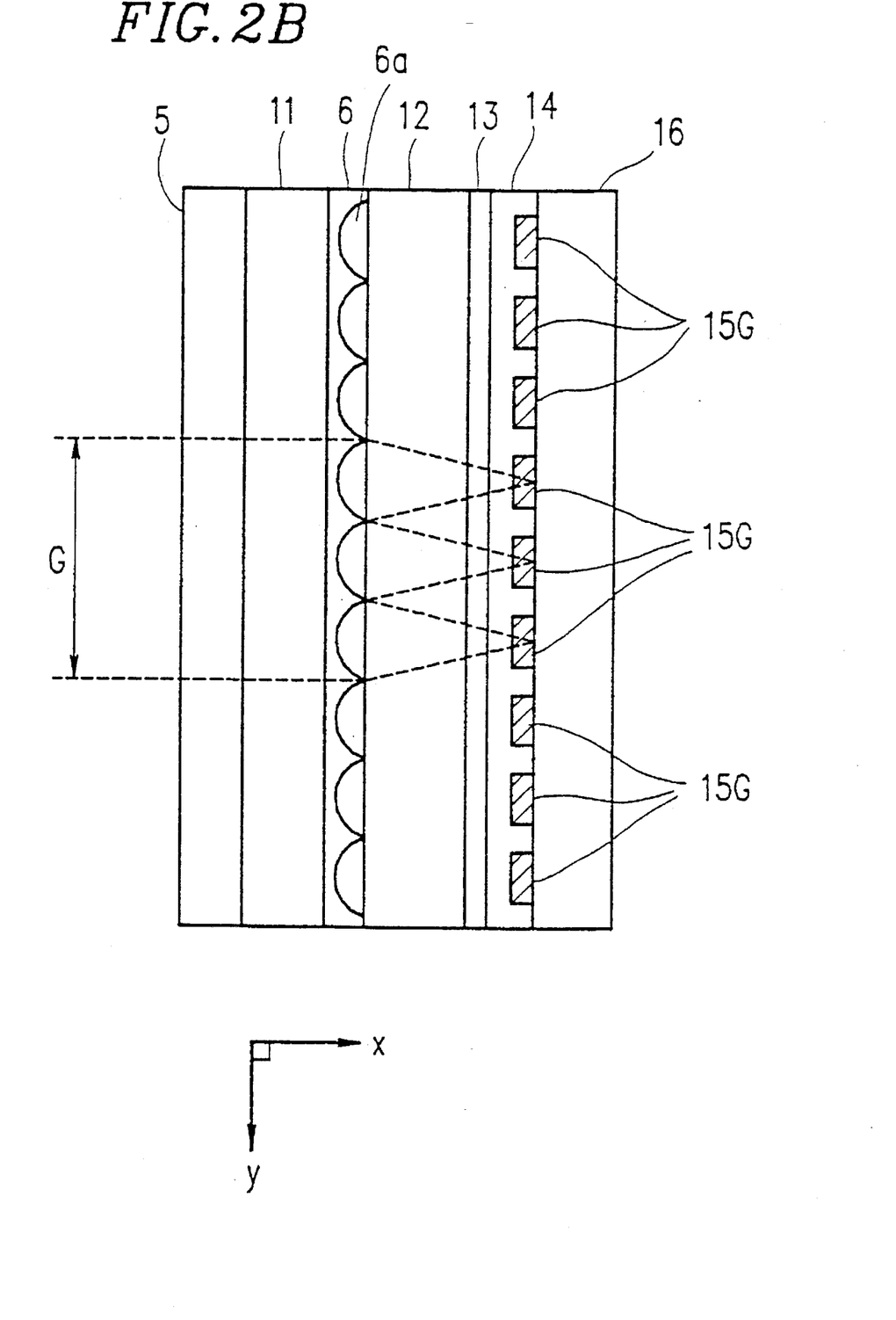
FIG. 2B is a cross-sectional view of the liquid crystal display device shown in FIG. 2A taken at the line a–b of FIG. 2A.

FIG. 2B is a schematic cross-sectional view showing the lenticular lens layers 5 and 6 and the liquid crystal display block 7 taken at line a–b of FIG. 2A. The bundle of rays (G) which has passed through the lenticular lens layer 5 and the glass substrate 11 is converged onto pixels 15G by a lenticular lens 6a.

Figure 3:
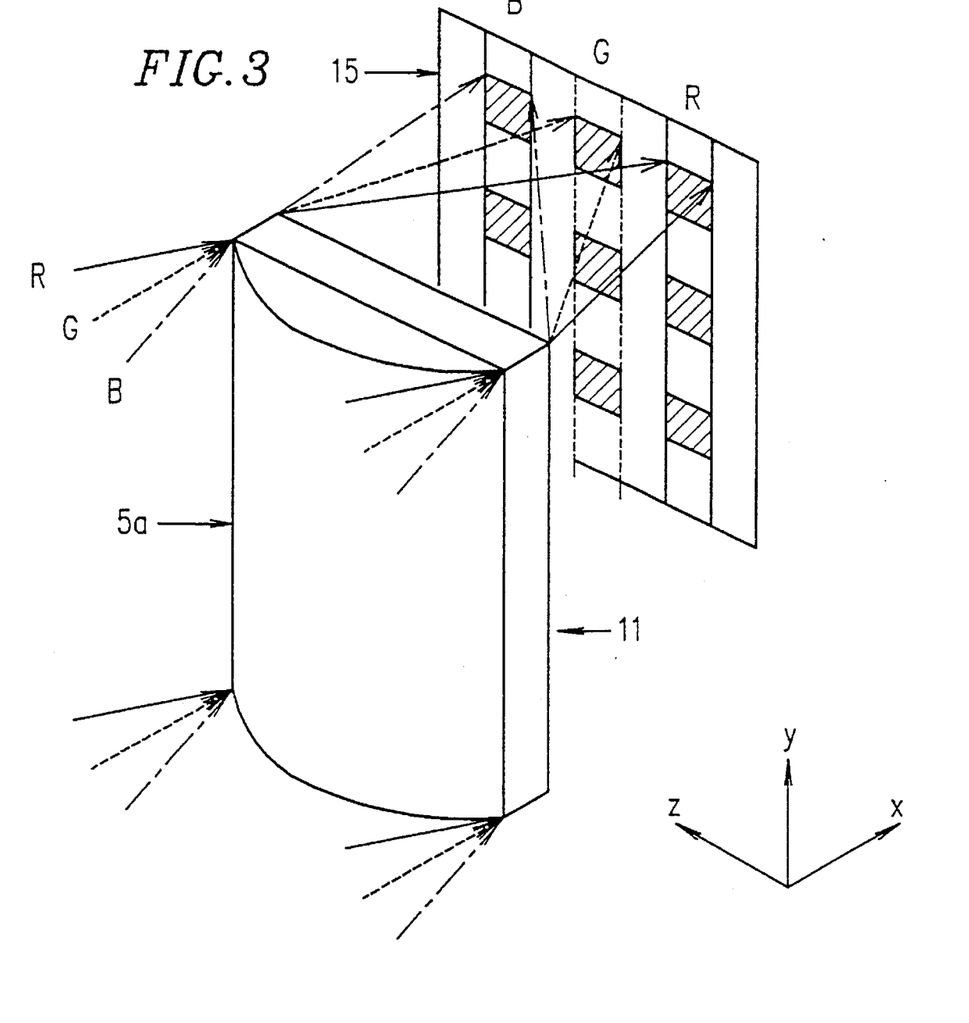
FIG. 3 is a view showing pixels of a liquid crystal display device and a light convergence state by a lenticular lens.

FIG. 3 shows the case where the lenticular lens layer 6 is not provided between the lenticular lens layer 5 and the liquid crystal display block 7. As shown in FIG. 3, each bundle of rays (R) and (B), which has been separated by the dichroic mirrors 4R and 4B, is incident on the lenticular lens layer 5 at an angle of 8° with respect to the light (G). The respective bundles of rays (R), (G), and (S) form converged light lines having a width of 26.4 μm and spaced at a pitch of 100 μm from each other, so as to be incident on pixels of red (R), green (G), and blue (B). The pixels (R), (G), and (B) perform optical modulation in accordance with image signals for the respective primary colors so as to generate a color image. Thus, according to this configuration, a color display can be conducted without using any color filters. As a result, no light absorption, which is a problem inherent to filters, occurs. However, the bundles of rays that are incident on the interspace between the pixels are not incident on the pixels and are wasted.

Figure 4:
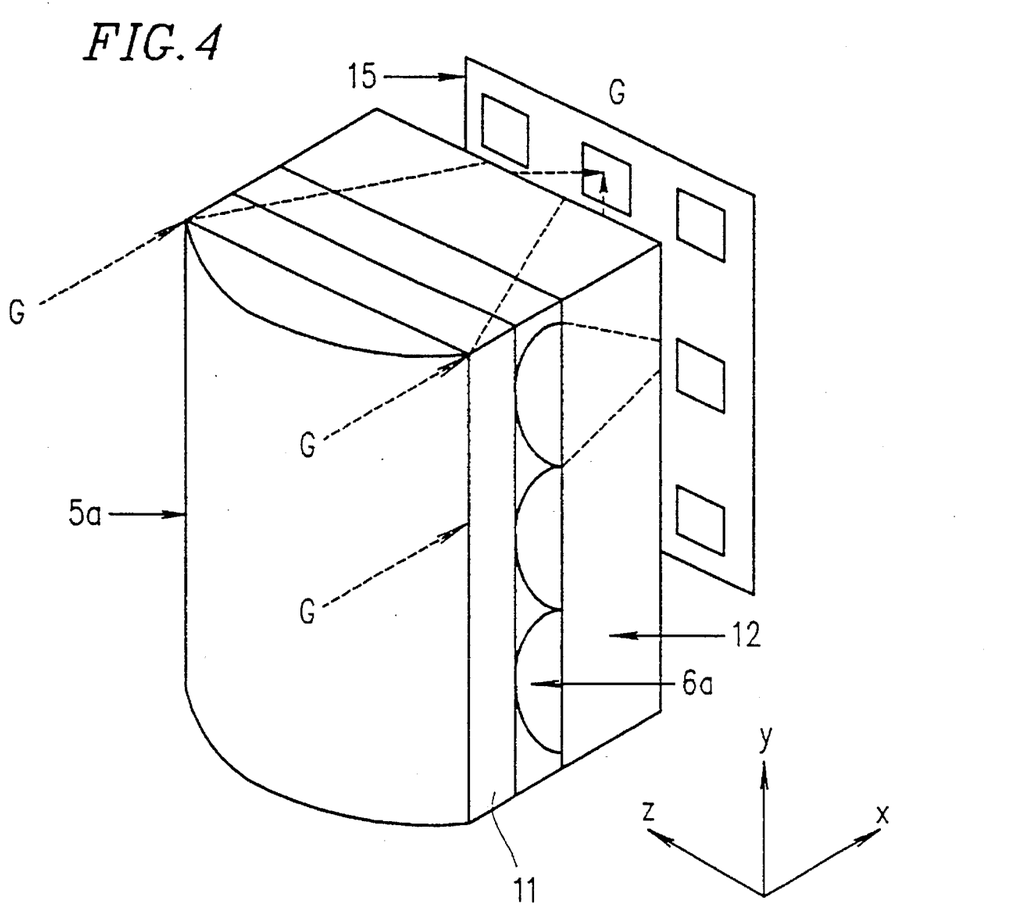
FIG. 4 is a view showing a liquid crystal display apparatus according to a first example of the present invention.

In the present example, the lenticular lens layer 6 for conducting convergence of light along the y-axis direction is further incorporated into the liquid crystal display apparatus, as shown in FIG. 4. Thus, the portions of light that would be wasted by being interrupted by a black matrix (not shown) in a conventional liquid crystal display apparatus can also pass through the pixel apertures (only a bundle of rays (G) is shown in FIG. 4). The lenticular lens layer 6 is composed of a plurality of semicylindrical lenticular lenses 6a disposed in parallel to each other along the z-axis direction. In other words, the lenticular lenses 6a are perpendicular to the lenticular lenses 5a. Moreover, the lenticular lenses 6a are disposed at the same pitch as that of the pitch of the pixels along the vertical direction (i.e., the y-axis direction), which is 100 μm in the present example. The optical axis of each lenticular lens 6a coincides with the center of each pixel aperture.

Since the lenticular lenses 5a of the lenticular lens layer 5 are perpendicular to the lenticular lenses 6a of the lenticular lens layer 6, the focal length of the lenticular lenses 5a is not affected by the addition of the lenticular lens layer 6. The function of the lenticular lens layer 6 is to converge bundles of rays along the y-axis direction onto the pixel apertures. Examples of conventional techniques using lenticular lenses arranged perpendicular to each other are disclosed in Japanese Laid-Open Patent Publication No. 2-149837 and the like. Although these methods use two lenticular lenses having pitches corresponding to the horizontal and vertical pitches of pixels, the two lenticular lenses being disposed perpendicular to each other, the lenses merely function to converge light along the vertical and horizontal directions. Color display is only attained by the incorporation of mosaic-like color filters, which disadvantageously absorb some of the light emitted from a light source. If a light source of the same brightness is used, a liquid crystal display apparatus having mosaic-like color filters will provide a brightness of one third of that of the liquid crystal display apparatus according to the present invention. The reason is that, according to the present example, the lenticular lens layers 5 and 6 ensure that substantially 100% of the light from the white light source 1 is incident on pixels. On the other hand, in the case of a liquid crystal display apparatus having color filters, a red color filter, for example, cannot transmit any green or blue light while it is capable of transmitting red light, resulting in so much less light being transmitted thereby.

The liquid crystal display apparatus of the present example is at least different from the liquid crystal display apparatus of Japanese Laid-Open Patent Publication No. 2-149837 in that:

(1) the lenticular lenses 5a have a pitch three times as large as the pitch of the pixels taken along the z-axis direction, and (2) color display is achieved without using color filters.

Moreover, according to the present invention, the lenticular lens layer 5 functions to converge and distribute bundles of rays, while the lenticular lens layer 6 functions to converge light along the y-axis direction. Thus, the lenticular lens layers 5 and 6 of the liquid crystal display apparatus of the present invention are incorporated for different purposes.

According to the present example, the focal points of the lenticular lenses 5a and 6a are prescribed so as to be located in the vicinity of the surface of the glass substrate 12 through which light goes out. In practice, since the thickness of the liquid crystal laser 14 is small, e.g., several μm (micrometers), the focal point of each lenticular lens 5a or 6a may be located at any point between the vicinity of a surface of the glass substrate 12 through which light goes out, and the vicinity of a surface of the glass substrate 16 through which light comes in. FIGS. 2A and 2B illustrate the case where the focal points of the lenticular lenses 5a and 6a are in the vicinity of surfaces of the pixels 15B, 15G, or 15R through which light goes out.

In the present example, the focal points of the lenticular lenses 5a and 6a are located in the vicinity of the surface of the glass substrate 12 through which light goes out. Accordingly, the following dimensions of the respective component elements are adopted in the present example. The thickness of the glass substrate 11: 0.4 mm; the thickness of the glass substrate 12: 0.7 mm; the thickness of the lenticular lens layer 5: several dozen μm (micrometers); the thickness of the lenticular lens layer 6: several μm (micrometers); and the focal length of the lenticular lens layer 6 in the atmosphere: 0.46 mm. It is ensured that the focal points of one lenticular lens 5a and its corresponding lenticular lens 6a coincide with each other, so that the diameter of the light spot becomes minimum.

As shown in FIG. 1, the arc of the white light source 1 extend along the y-axis. Accordingly, as will be seen from FIG. 4, the arc extends perpendicularly with respect to the direction along which the lenticular lenses 6a extend, i.e., the z-axis. In view of these two facts, a spot width D along the y-axis direction is derived by a similar calculation to that mentioned above, in accordance with the following equation (4):

$$D = A_L \times f/f_c \qquad (4)$$
$$= 5 \text{ mm} \times 0.46 \text{ mm}/60 \text{ mm} = 38.3 \text{ μm}$$

where $A_L$ represents the arc length of the white light source 1; and f represents the focal length of the lenticular lenses 6a. Accordingly, the size of the light spot is 38.3 μm×26.4 μm, which fits within the pixel aperture of 50 μm×70 μm.

Thus, the lenticular lens layer 6, being disposed as described above, serves to converge bundles of rays onto the pixel apertures which would otherwise be interrupted by a black matrix, as in a conventional configuration. As a result, the efficient ratio of the aperture of the liquid crystal display block is greatly increased. In other words, substantially 100% of the light emitted from the white light source 1 can be utilized by combining the lenticular lenses 5a and 6a in such a manner that each lenticular lens 5a is perpendicular to each lenticular lens 6a. Thus, according to the present invention, a bright color image can be obtained on the projection screen 10.

Figure 5:
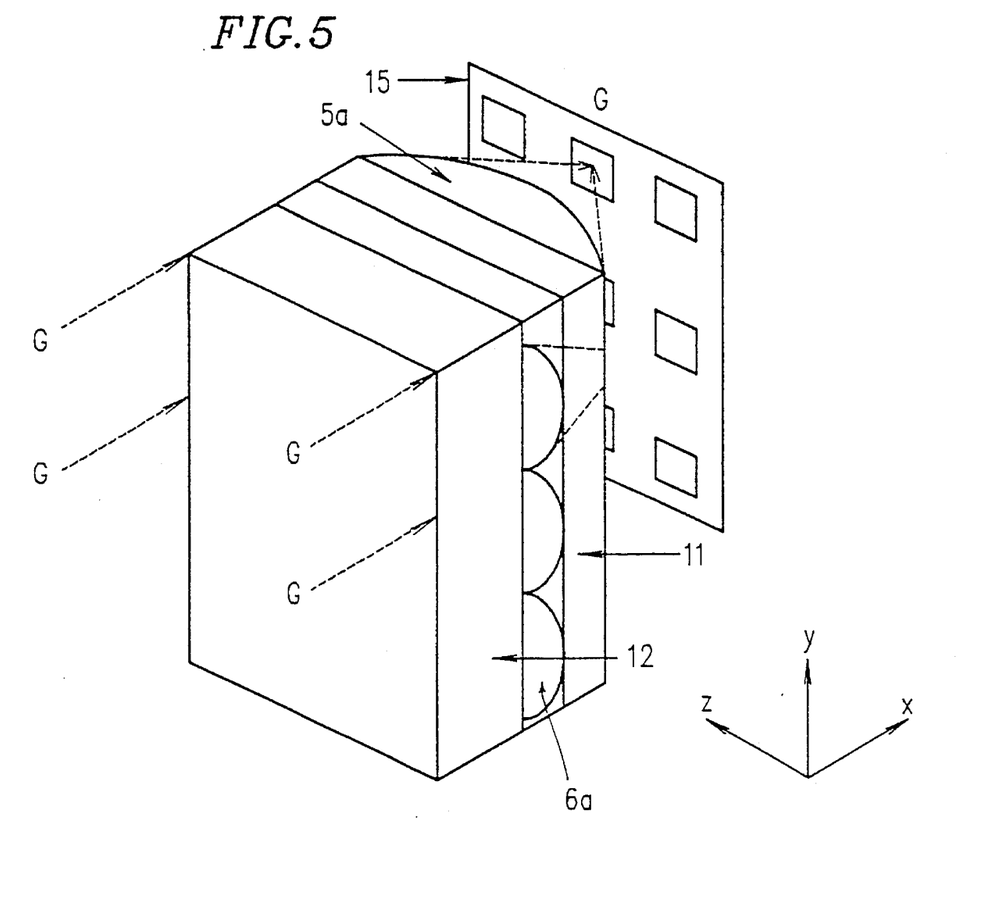
FIG. 5 is a view showing a variant of the first example of the present invention, where the positions of the two lenticular lenses are reversed.

In the example shown in FIGS. 1, 2A, 2B, and 4, light is led through the lenticular lens layer 5 and the lenticular lens layer 6 in this order, so as to be converged on the pixel apertures. However, the relative positions of the lenticular lens layers 5 and 6 can be reversed without undermining the effect of converging light onto the pixel apertures. For example, as shown in FIG. 5, the bundle of rays (R), (G), and (B) may be led through the lenticular lens layer 6 first and then the lenticular lens layer 5, so that the bundles of rays which have passed through the lenticular lens layer 5 are converged onto their corresponding pixels.

Similarly, in the example shown in FIGS. 6 and 7 (to be described later), the positions of the lenticular lens layers 5 and 6 can be reversed without undermining the effect of converging light onto the pixel apertures.

Although one white light source 1 is used in Example 1, separate light sources, i.e, a combination of a red light source, a green light source, and a blue light source, may alternatively be used. Although the use of such a combination of separate light sources may complicate the configuration of the liquid crystal display apparatus, there is an advantage in that light of a higher intensity can be obtained with the use of separate light sources. The liquid crystal display apparatus of Example 1, however, is capable of outputting bundles of rays of a sufficient brightness because it incorporates the lenticular lens layers 5 and 6, although only one white light source 1 is used, whose output light is separated into three bundles of rays.

EXAMPLE 2

Hereinafter, Example 2 of the present invention will be described.

In the present example, a liquid crystal display block having a higher resolution is used, along with the same optical system as that of Example 1, so that the size of the pixels is reduced to less than are half of that of the pixels of the liquid crystal display apparatus of Example 1. Accordingly, in order to reduce the size of the light spot, the focal length of the lenticular lenses 5a and 6a and the thickness of the glass substrate 12 must also be reduced in proportion to the reduction ratio of the pixel size. For example, if the pitch of the pixels of the liquid crystal display block is reduced by half, e.g., from 100 μm×100 μm to 50 μm×50 μm, and the size of the apertures of the pixels is reduced by half, e.g., from 50 μm×70 μm (vertical×horizontal) to 25 μm×35 μm (vertical×horizontal), the focal length of the lenticular lenses 6a becomes 0.23 mm, so that the glass substrate 12, on which the lenticular lens layer 6 is formed, is required to have a thickness of 0.35 mm. Although such a thin glass substrate may be broken during the process of forming lenticular lens layers on the glass substrate or the process of attaching the glass substrate onto the liquid crystal display block, Example 2 of the present invention provides a solution to this problem, as described below.

Figure 6:
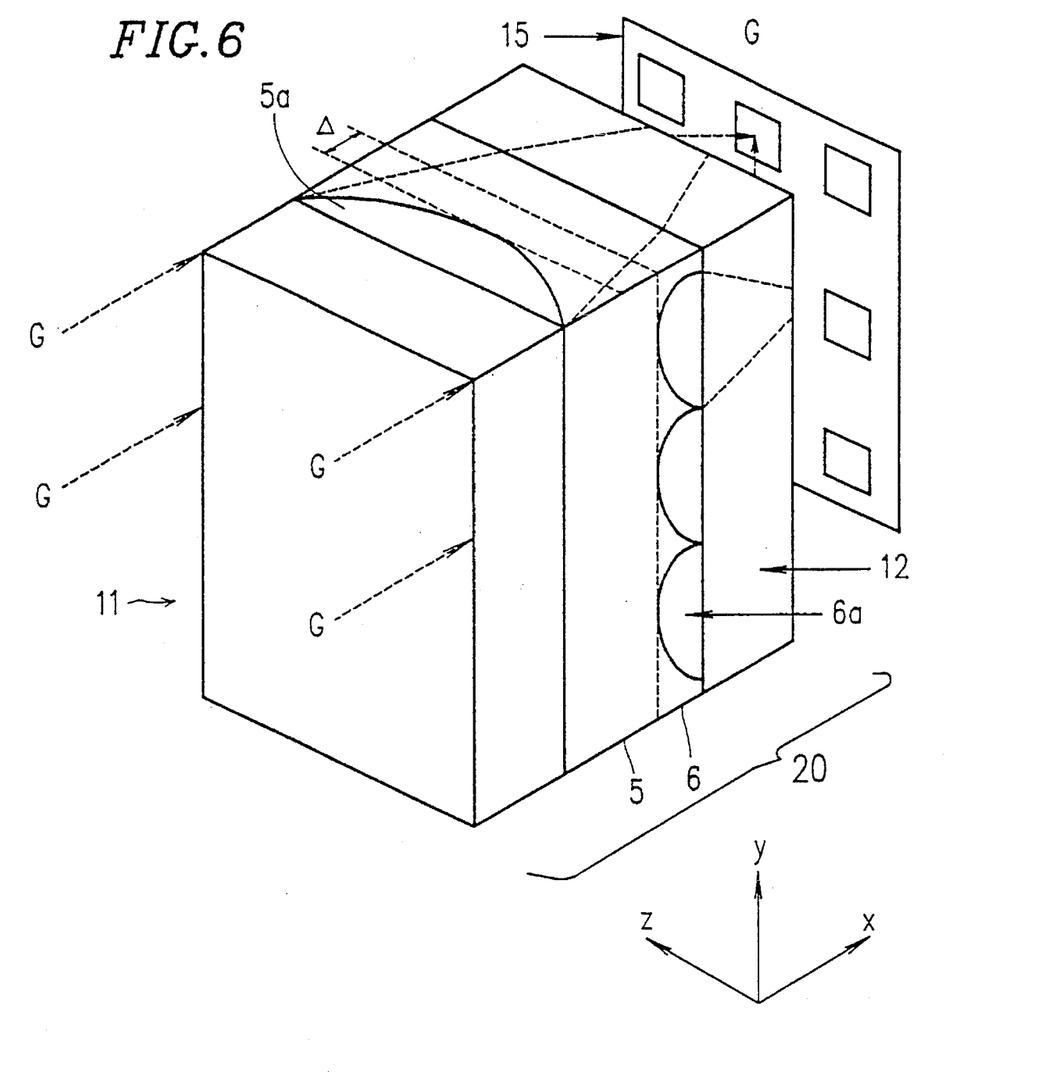
FIG. 6 is a view showing a liquid crystal display apparatus according to a second example of the present invention.

FIG. 6 shows a configuration for the liquid crystal display apparatus of Example 2, in which lenticular lenses 5a and 6a having a short focal length are incorporated. Lenticular lens layers 5 and 6 are both produced by the 2P method in the present example.

The liquid crystal display apparatus is produced by the following method: First, the lenticular lenses 5a and 6a are formed on glass substrates 11 and 12 by the 2P method. The glass substrates 11 and 12 are prepared somewhat thick. The lenticular lenses 5a and 6a are attached to each other in such a manner that convex portions of the lenticular lenses 5a are adjacent convex portions of the lenticular lenses 6a. The focal lengths of the lenticular lenses 5a and 6a are prescribed to here such values that the focal points of one lenticular lens 5a and its corresponding lenticular lens 6a coincide with each other, with respect to any light led therethrough. The difference between the refractive indices of a resin used for bonding and the lens material should preferably be large. The reason is that the focal lengths of the lenticular lenses 5a and 6a can be made smaller as the difference between the refractive indices of the bonding resin and the lens material increases. The above-mentioned resin may be filled in the interspace between the lenticular lenses 5a and the lenticular lenses 6a.

The glass substrate 12, which is disposed on the lenticular lens layer 6, is lapped so as to have a desired thickness. In the case where both sides of the glass substrate 12 are lapped, the thickness of the glass substrate 11 should be increased so as to compensate for the thickness of the glass substrate 12 that is lost by the lapping.

Herein, the pixel pitch of the liquid crystal display block is prescribed so as to be 50 μm×50 μm and the size of the apertures of the pixels is prescribed to be 25 μm×35 μm (vertical×horizontal). The focal length of the lenticular lens layers 5 and 6 in the atmosphere is prescribed to be 0.23 mm (the thickness of the lenticular lens layer 6 and the thickness Δ of the inter-space between the lenticular lens layers 5 and 6, are extremely small as compared with this focal length, and therefore are negligible). Accordingly, the glass substrate 12 is lapped so as to have a thickness of 0.35 mm. Since the same optical system as that used in Example 1 is used in the liquid crystal display apparatus of the present example, a light spot of a size measuring 19.2 μm×8.4 μm is obtained, which fits within each pixel aperture.

Thus, according to the present example, not only can bright color display be obtained, but also lenticular lenses having a short focal length can be provided in a high-resolution liquid crystal display block having a small pixel pitch without using thin glass substrates.

The glass substrate 12 may be formed so as to be thinner than the glass substrate 11. The reason is that;

(1) prescribing the thickness of the glass substrate 11 to be larger than a predetermined value can increase the strength of block 20 of the liquid crystal display apparatus including the lenticular lenses 5a and 6a, and (2) prescribing the thickness of the glass substrate 12 to be smaller than a predetermined value makes it possible to incorporate lenticular lenses 5a and 6a having a short focal length. In Example 1, similarly, it is applicable to prescribe the thickness of one of the glass substrates 12 and 11 that is disposed closer to the liquid crystal display block 7 to be smaller than the thickness of the other glass substrate (11 or 12), which is located farther from the liquid crystal display block 7.

EXAMPLE 3

Hereinafter, Example 3 of the present invention will be described.

Figure 7:
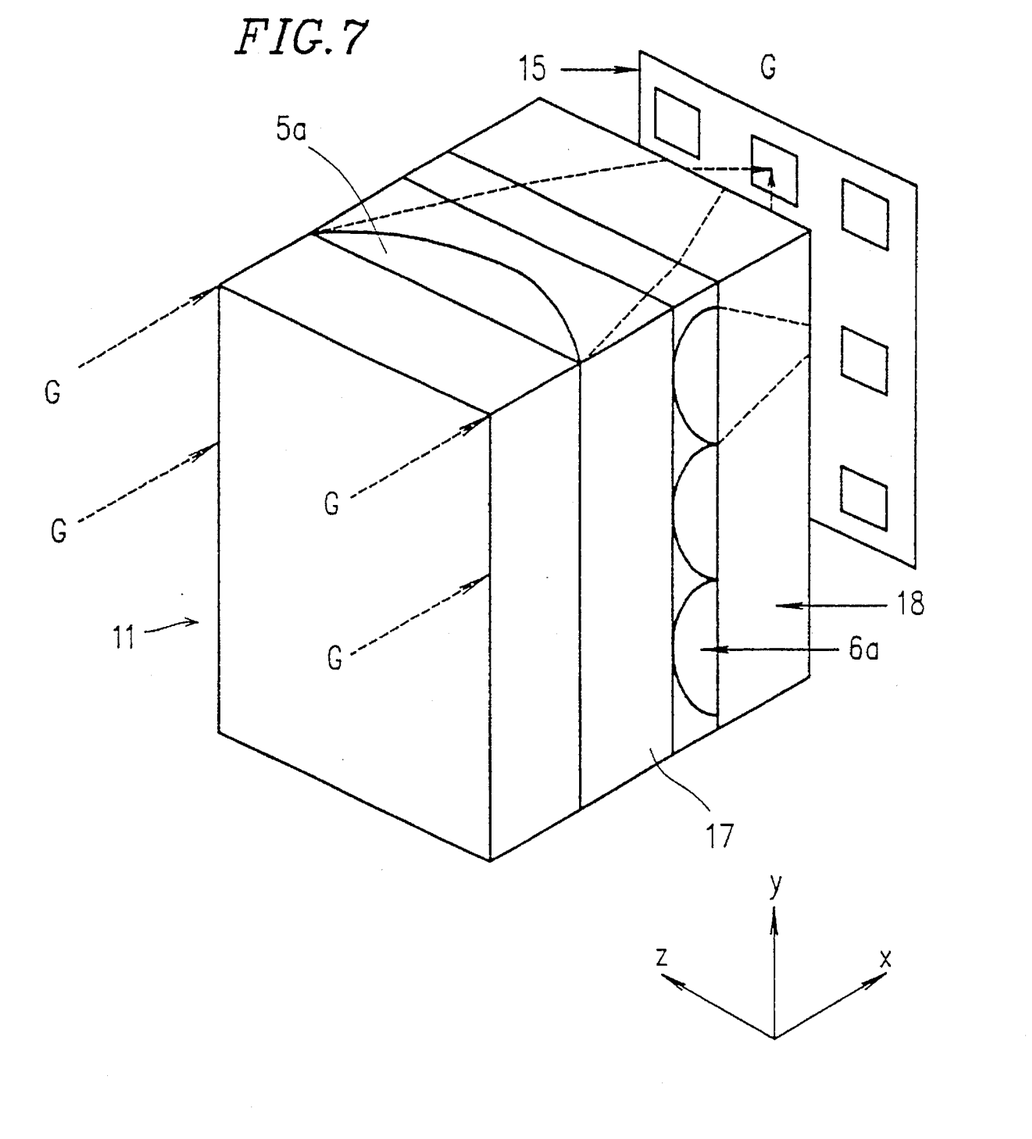
FIG. 7 is a view showing a liquid crystal display apparatus according to a third example of the present invention.

FIG. 7 shows the configuration for the liquid crystal display apparatus of Example 3. The liquid crystal display apparatus of the present example incorporates the same optical system as that of Example 1. Conditions such as the pixel pitch of the liquid crystal display block, the size of the pixel aperture, and the focal length of lenticular lenses 5a and 6a taken in the atmosphere are also the same as those in Example 1. In FIG. 7, reference numeral 18 represents a cover formed of a glass plate or a film having a thickness of 0.35 mm.

Hereinafter, the production process of the liquid crystal display apparatus of the present example will be described.

First, the lenticular lenses 5a are formed on a surface of the glass substrate 11 by the 2P method described above.

Next, a leveling material composed of a transparent resin or the like is applied onto the surface of each lenticular lens 5a and is cured while being subjected to a leveling process, thereby forming a leveling layer 17 having an even surface. As for the material of the leveling layer 17, polyimide, an ultraviolet-ray sensitive resin, or the like can be used. The material of the leveling layer 17 preferably has a refractive index greatly different from that of the lens material, as will be apparent from the reason described in Example 2.

Next, the lenticular lenses 6a are formed on the surface of the leveling layer 17 by a thermal sag method. According to the heat deformation method, a film of a photosensitive resin is patterned and then is thermally melted at a temperature equal to or higher than a melting point of the resin, so as to give a lens shape utilizing surface tension. According to the present example, a mask formed so as to correspond to the pitch of the lenticular lenses 6a of the lenticular lens layer 6 is used for conducting ultraviolet-ray exposure through the resin, thereby facilitating the production of a large amount of lenses.

The reason for not using the 2P method for the production of the lenticular lenses 6a is that, if ultraviolet-rays are radiated through the glass substrate 11, the ultraviolet-rays are absorbed by the lenticular lenses 5a and the leveling layer 17, thereby preventing the lens material from being cured. On the other hand, if the heat deformation method is used, the method involves a heating process, so that the lenticular lenses 5a and the leveling layer 17 are required to have enough heat-resistance so as not to be discolored or become decomposed at the heating temperature.

Finally, the cover 18 composed of a film having a thickness of 0.35 mm is adhered to the surface of an array of the lenticular lenses 6a. In the case where the cover 18 is composed of glass, a thicker glass plate may be previously adhered to the cover 18, the resultant glass composite being lapped to the desired thickness as described in Example 2. Next, transparent electrodes (not shown) are formed on the cover 18. The thickness of the cover 18 can be prescribed to be smaller than that of the glass substrate 11 for the same reason described in Example 2.

Thus, in accordance with the color liquid crystal display apparatus of the present invention, two lenticular lenses are combined so as to be perpendicular to each other. As a result, the utilization efficiency of the light emitted from a light source can be increased, and a bright color image can be obtained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A color liquid crystal display apparatus comprising:
   a transmission type liquid crystal display device comprising a plurality of pixels arranged in a matrix along a first direction and a second direction perpendicular to the first direction, wherein incident light is spatially modulated by selecting at least one of the plurality of pixels,
   light emitting means for emitting at least three bundles of rays of different wavelength bands at different angles;
   lens means provided between the liquid crystal display device and the light emitting means, the lens means converging the bundles of rays emitted from the light emitting means onto different ones of the plurality of pixels depending on the wavelength bands thereof,
   wherein the lens means comprises a first lenticular lens layer and a second lenticular lens layer, the first lenticular lens layer comprising a plurality of first lenticular lenses extending along the first direction, and the second lenticular lens layer comprising a plurality of second lenticular lenses extending along the second direction,
   wherein the first lenticular lenses are arranged at a pitch which is at least three times as large as a pitch at which the plurality of pixels are arranged along the second direction, and the second lenticular lenses are arranged at a pitch which is equal to a pitch at which the plurality of pixels are arranged along the first direction, and
   wherein the lens means is located between the light emitting means and the transmission type liquid crystal display device.

2. A color liquid crystal display apparatus comprising:
   a transmission type liquid crystal display device comprising a plurality of pixels arranged in a matrix along a first direction and a second direction perpendicular to the first direction, wherein incident light is spatially modulated by selecting at least one of the plurality of pixels,
   a white light source for emitting white light;
   light splitting means for splitting the white light emitted from the white light source intro at least three bundles of rays of different wavelength bands, the bundles of rays going out from the light splitting means at different angles;
   lens means provided between the liquid crystal display device and the light splitting means, the lens means converging the bundles of rays led through the light splitting means onto different ones of the plurality of pixels depending on the wavelength bands thereof,
   wherein the lens means comprises a first lenticular lens layer and a second lenticular lens layer, the first lenticular lens layer comprising a plurality of first lenticular lenses extending along the first direction, and the second lenticular lens layer comprising a plurality of second lenticular lenses extending along the second direction,
   wherein the first lenticular lenses are arranged at a pitch which is at least three times as large as a pitch at which the plurality of pixels are arranged along the second direction, and the second lenticular lenses are arranged at a pitch which is equal to a pitch at which the plurality of pixels are arranged along the first direction,
   wherein the lens means is located between the white light source and the transmission type liquid crystal display device.

3. A color liquid crystal display apparatus according to claim 2, wherein the second lenticular lens layer is located between the first lenticular lens layer and the liquid crystal display device.

4. A color liquid display apparatus according to claim 3, wherein the second lenticular lens layer is in close contact with the liquid crystal display device.

5. A color liquid display apparatus according to claim 3, wherein the second lenticular lens layer is formed on one of a pair of substrates included in the liquid crystal display device.

6. A color liquid crystal display apparatus according to claim 3, wherein the first lenticular lens layer is located between the second lenticular lens layer and the liquid crystal display device.

7. A color liquid crystal display apparatus according to claim 2, wherein the first lenticular lens layer is formed on a first transparent substrate, and the second lenticular lens layer is formed on a second transparent substrate.

8. A color liquid crystal display apparatus according to claim 7, wherein one of the first and second transparent substrates that is located closer to the liquid crystal display device is thinner than one of the first and second transparent substrates that is located farther from the liquid crystal display device.

9. A color liquid crystal display apparatus according to claim 8, wherein the first and second transparent substrates with the first and second lenticular lens layer formed thereon, respectively, are attached to each other in such a manner that the first lenticular lens layer and the second lenticular lens layer are adjacent each other.

10. A color liquid crystal display apparatus according to claim 9, wherein an adhesive layer is provided between the first lenticular lens layer and the second lenticular lens layer.

11. A color liquid crystal display apparatus according to claim 9, wherein at least one of the first and second transparent substrates is lapped to a predetermined thickness.

12. A color liquid crystal display apparatus according to claim 2,
   wherein the first lenticular lens layer is formed on a transparent substrate;
   a transparent leveling layer is formed on the first lenticular lens layer so as to form an even surface over the first lenticular lens layer; and
   the second lenticular lens layer is formed on the even surface of the leveling layer.

13. A color liquid crystal display apparatus according to claim 12, wherein a cover is provided on a surface of the second lenticular lens layer.

14. A color liquid crystal display apparatus according to claim 13, wherein the cover is made of glass.

15. A color liquid crystal display apparatus according to claim 14, wherein the glass is lapped to a predetermined thickness.

16. A color liquid crystal display apparatus according to claim 13, wherein the cover is a film.

17. A color liquid crystal display according to claim 13, wherein the cover is thinner than the transparent substrate.

* * * * *